No. 652,058. Patented June 19, 1900.
C. E. TRIPLER.
LIQUEFIER FOR ATMOSPHERIC AIR.
(Application filed Feb. 17, 1900.)
(No Model.)
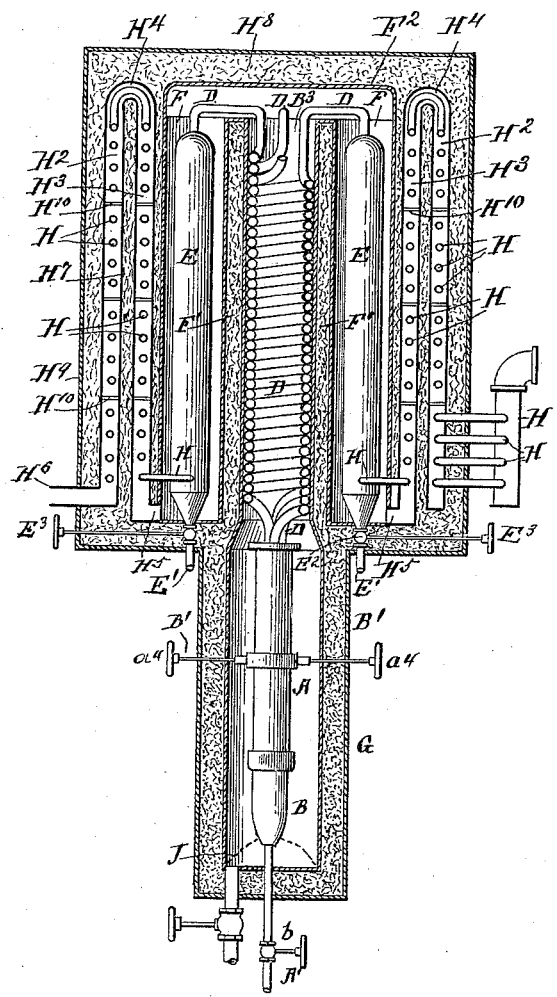
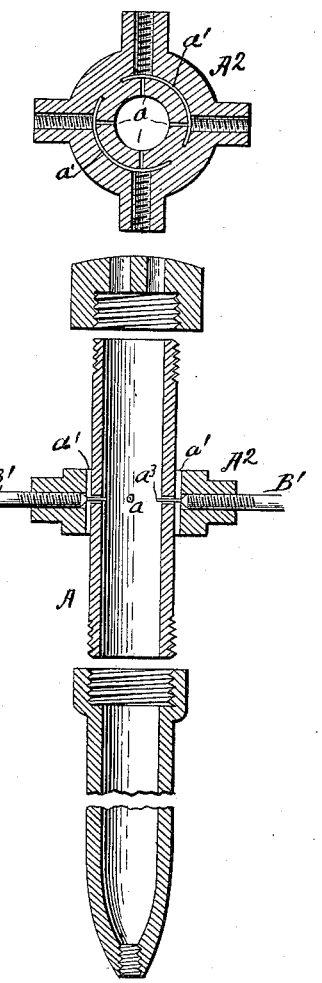
Witnesses:
Raymond J. McMillan
Francis T. Sargent
Inventor:
Charles E. Tripler
By H. A. West
Attorney

UNITED STATES PATENT OFFICE.

CHARLES E. TRIPLER, OF NEW YORK, N. Y.

LIQUEFIER FOR ATMOSPHERIC AIR.

SPECIFICATION forming part of Letters Patent No. 652,058, dated June 19, 1900.

Application filed February 17, 1900. Serial No. 5,592. (No model.)

*To all whom it may concern:*

Be it known that I, CHARLES E. TRIPLER, a citizen of the United States, and a resident of New York, in the county of New York and State of New York, have invented certain new and useful Improvements in Liquefiers for Atmospheric Air, of which the following is a specification.

The object of this invention is such construction of a liquefier for atmospheric air that all foreign gases, such as carbonic-acid gas and others, contained in the compressed air forced into the liquefier, and which foreign gases liquefy at a temperature higher than that at which atmospheric air liquefies, will be separated from the compressed air in the liquefier before the expansion of the compressed air, thus obviating the danger of the clogging of the liquefier by foreign solidified gases and leaving only practically-pure air for expansion and liquefaction. All moisture is likewise separated from the compressed air within the apparatus before the compressed air reaches the expander.

The invention also consists in the construction, combination, and arrangement of parts, all as hereinafter described and claimed.

In the accompanying drawings, to which reference is made and which form a part of this specification, Figure 1 is a sectional elevation of my new liquefier. Fig. 2 is an enlarged sectional view of the expander, showing the preferred construction thereof.

In the drawings, A represents the expander, held in the casing B. One or more small orifices $a$ are formed through the body of the expander at a point above its lower end, so that that portion of the hollow interior of the expander below the said orifices forms a chamber or trap to receive any foreign matter which liquefies inside of the expander, which foreign matter may from time to time be drawn off or blown out of the trap by opening a cock $b$ in the pipe A', which extends from the trap to the outside of the apparatus. Around the expander A is formed or placed a baffle or ring $A^2$, which together with the outer surface of the body of the expander forms a narrow space or spaces $a'$, and in the said ring are screwed as many rods B' as there are orifices $a$ in the expander, and each rod is provided with a small point or needle $a^3$, which enters an orifice $a$ a greater or less distance, accordingly as the rod is screwed in or out by the outside crank $a^4$. The chamber B is formed with an extension or is connected to another chamber $B^3$, in which a series of pipes D are placed. I do not limit myself to any specific number of pipes, as I may use one or more. As here shown, there is a group of four pipes. These pipes may be straight or in coiled form and are for supplying compressed air to the interior of the expander A—that is, their inner ends terminate in the head of the expander, as shown. The outer end of each pipe D is connected with a chamber or trap E, preferably a pipe of larger diameter than the pipe D. The traps E are by preference each contained in a larger tube or casing F. These casings F are separated from the chamber $B^3$ by lagging or packing F' of mineral wool, felt, or other suitable non-conducting material, and this packing surrounds the casings F, the same being confined by the shell $F^2$. The packing F' is extended to surround the chamber B, the same being suitably confined, preferably by the outer shell or covering G.

Compressed air is supplied to each chamber or trap E through a separate pipe H, the inner end of which connects with the chamber or trap at or near its lower end, while its outer end connects with a suitable air-compressor, not necessary to be shown or described more than to say that it should have a capacity of supplying compressed air at a pressure of about two thousand five hundred pounds to the square inch. As here shown, the four separate pipes H connect with a single pipe H', which leads to the air-compressor.

The pipes H are by preference in two coils, one lying outside of the other in concentric chambers or channels $H^2 H^3$, said chambers communicating at the top, as shown at $H^4$. The tubes F each communicate at or near their lower ends with the chamber $H^2$ through a passage $H^5$. A single outlet-pipe or exhaust $H^6$ leads out from the chamber $H^2$. The chambers $H^2 H^3$ are separated by packing $H^7$ of mineral wool, felt, or other suitable non-conducting material, and similar non-conducting material $H^8$ is placed around the whole interior of the apparatus, the same being confined by the main outer casing or shell H⁹.

H¹⁰ H¹⁰ represent horizontal spiral partitions placed in the chambers H² H³ between groups of coils, so that the outgoing air must circle several times around among the pipes before reaching the exit H⁶.

E' E² represent discharge-pipes and cocks or valves therein, through which the contents of the chambers or traps E may be discharged on opening the valves or cocks by operating the same by the valve-rods E³.

Compressed air being forced into the pipes H, it is led up the outer coil and down the inner coil of each pipe and enters each of the chambers or traps E. Thence it enters the central pipes D and is led thereby to the interior of the expander A, from which it expands through the orifices $a$. The jets of expanded air are reverted by the baffle or ring A² upon the exterior of the expander A. The air which liquefies flows down to the bottom of the apparatus and may be drawn off through the pipe A³ and valve A⁴. The air which passes through the orifices and does not liquefy, but is of low temperature, passes to the chamber B³ among the pipes D and lowers the temperature of the compressed air contained therein on its way to the expander. From the central chamber B³ the expanded air passes down the pipes or chambers E, chilling the compressed air in the traps E, and thence through openings H⁵ to the inner surrounding chamber H², around which it circles, thence in like manner around and down the outer chamber H³, chilling the compressed air in the pipes, and out at the opening H⁶.

The chilling effect of the expanded air condenses to liquid certain impurities, moisture, and foreign matter in the air, which liquid collects in the chambers or traps E and from which the same may be blown out through the pipes E', as above stated. Certain other impurities collect on the trap formed by that portion of the hollow expander A below the orifices $a$, so that when the compressed air expands through the said orifices it is practically free of all gases having a higher critical temperature than that of air, and hence freezing up or clogging of the expander is obviated and the continuous operation of the machine insured and prevents contamination of the liquid air produced.

In some cases the casing B will be filled with a packing of mineral wool, felt, or other suitable material around the expander, and in such instances the wire-cloth support J will be employed to support the packing, and a suitable cooler may be employed to extract the heat of compression from the compressed air as it leaves the compressor and before it enters the apparatus.

While I have shown the baffles for the jets of compressed air which issue from the orifices in the body of the expander as cast with the body of the expander, I do not wish to be understood as limiting myself to this particular form of construction, as the walls of the main casing or other means held adjacent to the orifices may be relied upon in place of the ring A²; but the employment of this ring is preferable in consequence of furnishing firm bearings and supports for the inner ends of the needle-point rods.

Having thus described my invention, what I claim as new, and desire to secure by Letters Patent, is—

1. A liquefier for atmospheric air comprising an exterior or main casing the interior of which is divided into channels or chambers for outgoing expanded air and which communicate alternately at top and bottom the exterior one of which is open at the outside of the said casing, a coil of pipe in said channels or chambers to which coil compressed air is supplied, an expander located in said casing and having one or more orifices through which the compressed air is expanded and in which expander the said coil of pipe terminates, and a trap connected in said coil of pipe, the said trap being located in one of said channels or chambers, and having a discharge-opening reaching to the outside of the apparatus, substantially as and for the purposes described.

2. A liquefier for atmospheric air comprising an exterior casing, the interior of which is divided into channels or chambers for outgoing expanded air and which communicate alternately at top and bottom the exterior one of which is open at the outside of the casing, a plurality of pipes coiled in said channels or chambers and to which compressed air is supplied, an expander located in the said casing and having one or more orifices through which the compressed air is expanded and in which said expander the said coils of pipe terminate, and a trap connected in each of said pipes, the said traps being located in one of said channels or chambers, and each having a discharge-opening reaching to the outside of the apparatus, substantially as and for the purposes described.

3. A hollow expander for condensing or liquefying atmospheric air, the same having one or more small orifices in the body above the bottom thereof, in combination with a main casing inclosing said expander, a pipe in said casing for supplying compressed air to the interior of said expander and a discharge-pipe and means for closing the same leading from the interior of the expander below the said orifices to the exterior of the said casing, substantially as and for the purposes described.

4. A hollow expander for condensing or liquefying atmospheric air, the same having one or more small orifices in the body above the bottom thereof, a baffle outside of said orifices and spaced from the body of the expander, and a chamber for receiving the liquid air formed on the outside of the expander, in combination with a discharge-pipe having means for closing the same leading from the interior of the hollow expander below the said orifices, for drawing from the interior of the expander the liquid produced inside the expander from gases which liquefy at a temperature higher than that at which atmospheric air liquefies, substantially as described.

5. A liquefier for atmospheric air consisting of an outer main casing divided into a series of concentric channels connected alternately at top and bottom the outer one of which is open at the outside of the main casing for the exhaust of expanded air, a series of coils of pipe in said channels to which coils compressed air is supplied, an expander connected to the inner ends of said coils of pipe for the expansion of the compressed air, and a series of traps, one connected in each of said coils of pipe and located in a separate chamber in one of said channels, each trap having a discharge-pipe leading to the outside of the apparatus, substantially as and for the purposes described.

6. A hollow expander for atmospheric air, having one or more orifices formed therein at a point between the ends thereof, in combination with a ring spaced from and surrounding the expander adjacent to the said orifices and openings in said ring, in combination with needle-pointed rods fitted in said openings, substantially as described.

CHARLES E. TRIPLER.

Witnesses:
RAYMOND J. MCMILLAN,
H. ALBERTUS WEST.